(No Model.)
W. B. ALLEN.
THILL COUPLING.
No. 362,052. Patented May 3, 1887.
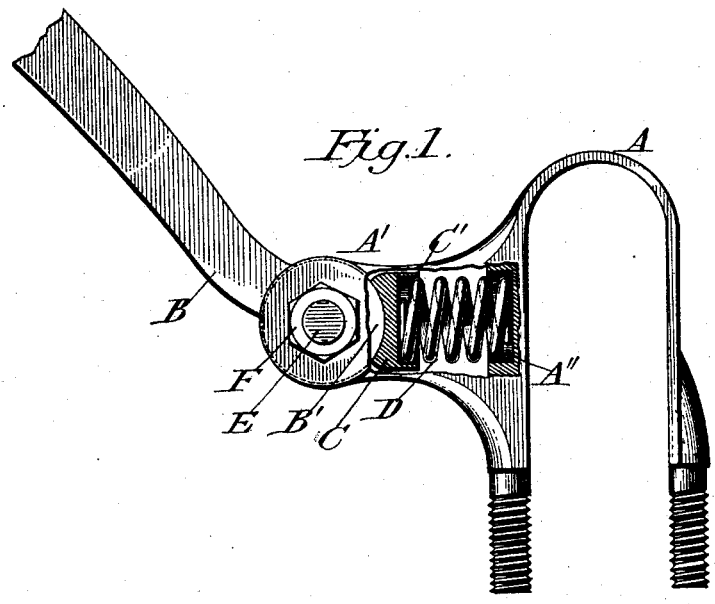
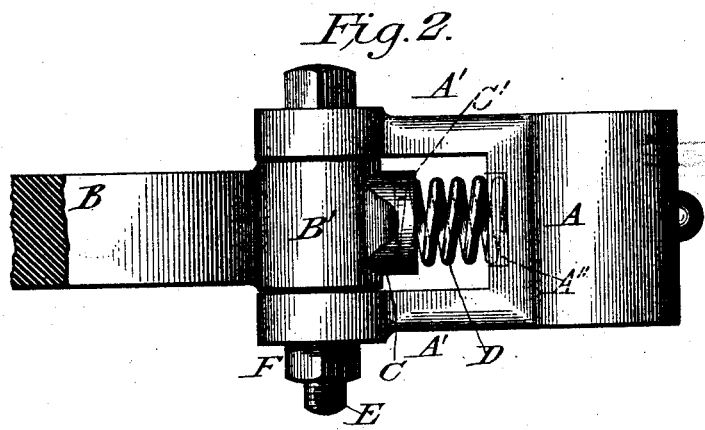
Witnesses:
Rob. E. M. Schubert
Richard Wittmann
Inventor:
Wm. B. Allen
By his Atty.
James Buchanan
N. PETERS. Photo-Lithographer, Washington, D. C.

UNITED STATES PATENT OFFICE.

WILLIAM B. ALLEN, OF TRENTON, NEW JERSEY.

THILL-COUPLING.

SPECIFICATION forming part of Letters Patent No. 362,052, dated May 3, 1887.

Application filed March 17, 1887. Serial No. 231,248. (No model.)

*To all whom it may concern:*

Be it known that I, WILLIAM B. ALLEN, a citizen of the United States, residing in the city of Trenton, in the county of Mercer and State of New Jersey, have invented a new and useful Improvement in Thill-Couplings, of which the following is a specification.

My invention relates to that part of thill-couplings by which all noise of rattling and the like is avoided, and is shown by the mechanism hereinafter described, and also by the accompanying drawings, in which drawings similar letters of reference indicate similar parts.

Heretofore rubber has been used for deadening the sound in such couplings, but it soon wears out or loses its elasticity, and frequently, when the carriage is used on rough roads, jars out of place and is lost. Besides, the rubber serves only to prevent the jarring while the parts are new. When the bolt or the eye through which it passes becomes worn, and the thill is thereby drawn farther from the axle, the rubber does not expand, and a new and thicker rubber becomes necessary. I avoid all these difficulties and secure a continued means of avoiding all rattling by the device shown in the drawings.

In the drawings, Figure 1 shows a side view of my invention with a portion of one of the lips of the clip cut away to show more clearly the invention. Fig. 2 is a top view of my invention.

In Fig. 1, A is the clip which surrounds the axle. A' is the lip attached thereto and which serves to hold the bolt which passes through the eye of the goose-neck of the thill. B is such goose-neck. Against the rounded end B' of this goose-neck is placed a piece, C, hollowed or curved in front to fit the rounded end of the goose-neck. This piece is shown in section, to show the cup-like cavity C' in its rear side. A similar cavity in the front of the clip is shown at A". Resting within these cavities, and reaching from one to the other, is the spring D.

In Fig. 2 is shown more clearly the bolt E, passing through the lips A' and the eye of the goose-neck B, and held in place by the nut F. The spring D is forced into place with so much force that it exerts a constant pressure against the bottom of these cup-like cavities and bears the piece C constantly and firmly against the rounded end B', and thus keeps the whole in position. As the bolt E wears or the eye enlarges from wear, this pressure is still exerted and keeps the rounded end firmly against the bolt, making a simple, durable, and efficacious preventive of rattling.

What I claim as my invention is—

1. The clip A, provided with the cup-like cavity A", in combination with the piece C, bearing against the rounded end B' and provided with a similar cup-like cavity, and the spring D, substantially as shown and described.

2. The piece C, bearing against the rounded end B' and kept against said rounded end by a spring resting in a cup-like cavity in said piece and a similar cup-like cavity in the clip, substantially as shown and described.

WILLIAM B. ALLEN.

Witnesses:
 CHARLES B. CASE,
 FRED. A. DUGGAY.